United States Patent
Kawakami et al.

(10) Patent No.: US 9,718,514 B2
(45) Date of Patent: Aug. 1, 2017

(54) ELECTRICALLY ASSISTED BICYCLE

(75) Inventors: Masafumi Kawakami, Nara (JP); Munehiro Date, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 280 days.

(21) Appl. No.: 14/413,392

(22) PCT Filed: Jul. 11, 2012

(86) PCT No.: PCT/JP2012/004461
§ 371 (c)(1),
(2), (4) Date: Jan. 7, 2015

(87) PCT Pub. No.: WO2014/009995
PCT Pub. Date: Jan. 16, 2014

(65) Prior Publication Data
US 2015/0191215 A1    Jul. 9, 2015

(51) Int. Cl.
*B62M 6/55* (2010.01)
*B62M 6/50* (2010.01)

(52) U.S. Cl.
CPC ............... *B62M 6/55* (2013.01); *B62M 6/50* (2013.01); *Y10T 74/19014* (2015.01); *Y10T 477/24* (2015.01)

(58) Field of Classification Search
CPC .. Y10T 477/26; Y10T 74/19014; B26M 6/50; B26M 6/55
See application file for complete search history.

(56) References Cited

U.S. PATENT DOCUMENTS

| | | | | |
|---|---|---|---|---|
| 2,331,976 A | * | 10/1943 | Hare | B62M 9/00 180/16 |
| 5,758,736 A | * | 6/1998 | Yamauchi | B62M 6/45 180/206.4 |
| 5,915,493 A | * | 6/1999 | Nakayama | B62M 6/40 180/206.4 |

(Continued)

FOREIGN PATENT DOCUMENTS

| | | |
|---|---|---|
| DE | 102009045447 | 6/2010 |
| DE | 102010060482 | 5/2012 |

(Continued)

OTHER PUBLICATIONS

Extended European Search Report, Jun. 11, 2015; European Patent Application No. 12881077.7 (8 pages).

*Primary Examiner* — Stacey Fluhart
(74) *Attorney, Agent, or Firm* — Hamre, Schumann, Mueller & Larson, P.C.

(57) ABSTRACT

An electrically assisted bicycle is provided with a so-called single-shaft motor drive unit that can satisfactorily keep torque detection capability. The outer periphery of a crankshaft 7a has a cylindrical human-power transmission member 28 having a torque sensor 31 for detecting a human driving force and a combined force member 29 that combines a human driving force and an auxiliary driving force from a motor 21. A one-way clutch is not provided on a driving force transmission path including the crankshaft 7a, the human-power transmission member 28, and the combined force member 28. The human-power transmission member 28 and the combined force member 29 are always rotated in response to a rotation of the crankshaft 7a.

6 Claims, 10 Drawing Sheets

(56) References Cited

U.S. PATENT DOCUMENTS

| | | | | |
|---|---|---|---|---|
| 6,554,730 B1 * | 4/2003 | Sakai | ................ | B62M 6/55 180/206.4 |
| 2011/0303474 A1 | 12/2011 | Kimmich et al. | | |
| 2012/0048635 A1 * | 3/2012 | Kuroki | ................ | B62M 6/45 180/206.2 |
| 2013/0277131 A1 | 10/2013 | Becker | | |

FOREIGN PATENT DOCUMENTS

| | | | | |
|---|---|---|---|---|
| EP | 0776818 | | 6/1997 | |
| EP | 0765804 | | 10/2002 | |
| JP | 9-95289 | | 4/1997 | |
| JP | 10-250673 | | 9/1998 | |
| JP | 10-316081 | | 12/1998 | |
| JP | 2008114851 | * | 5/2008 | ............. B62M 6/55 |
| JP | 2009-208710 | | 9/2009 | |
| KR | 20120058209 | | 6/2012 | |

\* cited by examiner

PRIOR ART

ELECTRICALLY ASSISTED BICYCLE

TECHNICAL FIELD

The present invention relates to an electrically assisted bicycle that can travel with a combination of a human driving force generated by a pedal force from a pedal and an auxiliary driving force generated by a motor.

BACKGROUND ART

In a known electrically assisted bicycle including a motor, power is fed from a power storage such as a battery to the motor, a human driving force, which includes a pedal force applied to a pedal, is detected by a torque sensor, and an auxiliary driving force (assisting force) of the motor is added according to the human driving force. Thus, such an electrically assisted bicycle can smoothly travel on an uphill or the like.

In such an electrically assisted bicycle, a motor drive unit including a motor is disposed near a crankshaft. Moreover, the electrically assisted bicycle configured thus has a relatively heavy motor drive unit that is disposed at a low position at the center of the electrically assisted bicycle (that is, an intermediate point between a front wheel and a rear wheel) in the longitudinal direction. Thus, the front and rear wheels of the electrically assisted bicycle configured thus can be more easily lifted than an electrically assisted bicycle having a motor in the hub of a front or rear wheel. Such an electrically assisted bicycle can easily pass over a step of a path, achieving ease of handling and high traveling stability.

Figure 9:
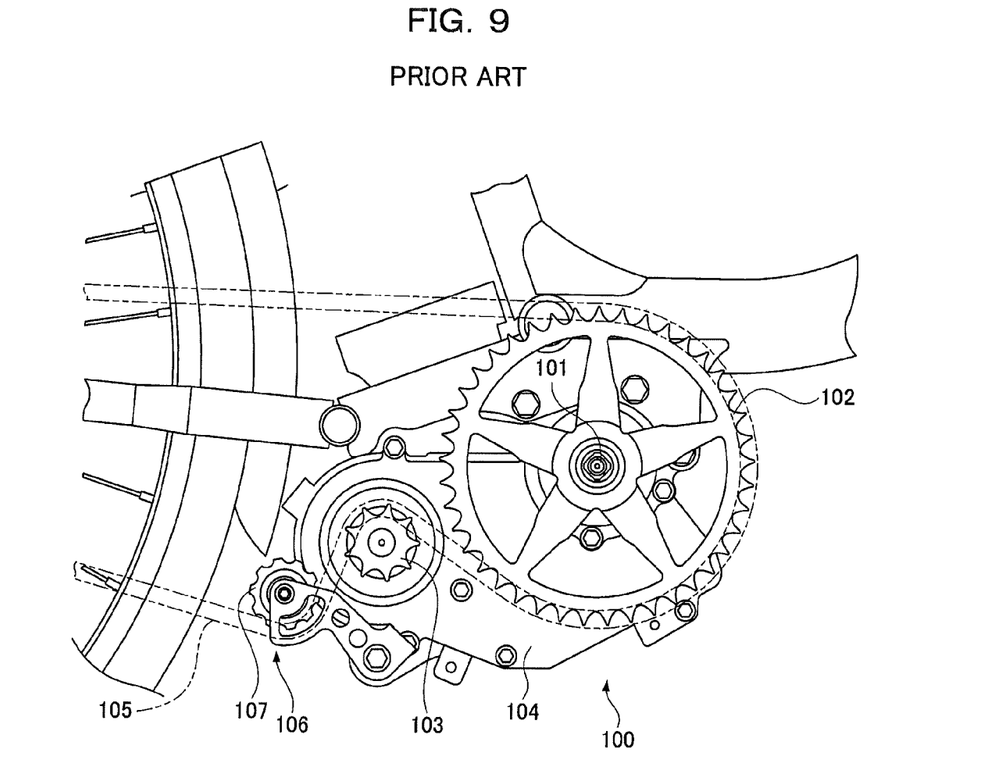
FIG. 9 is a side view showing a double-shaft motor drive unit and a portion near the motor drive unit in a conventional electrically assisted bicycle.
Figure 10:
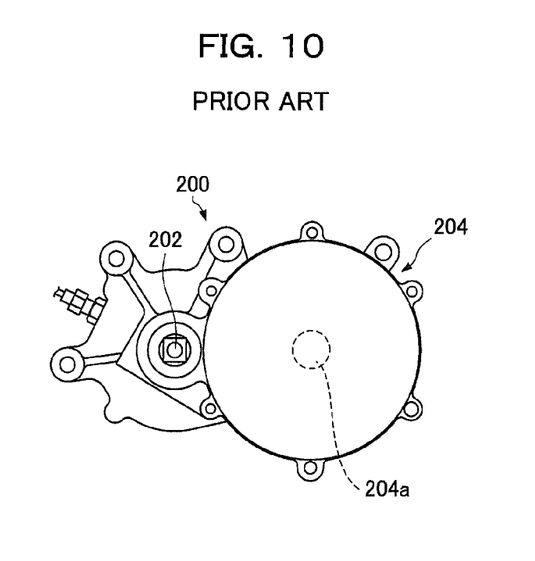
FIG. 10 is a side view showing a single-shaft motor drive unit in the conventional electrically assisted bicycle.
Figure 11:
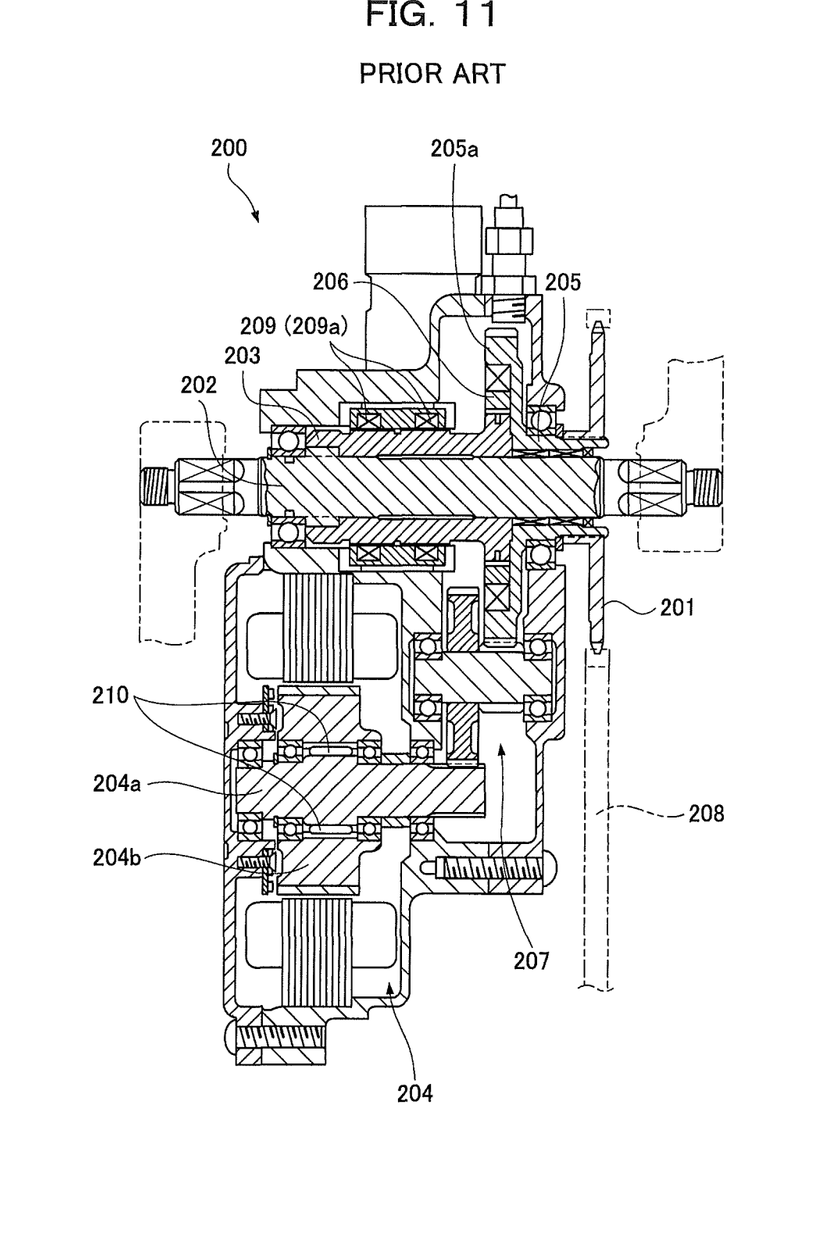
FIG. 11 is a plane section showing the single-shaft motor drive unit in the conventional electrically assisted bicycle.

Motor drive units to be provided in such an electrically assisted bicycle are broadly classified into a so-called double-shaft motor drive unit 100 that includes, as shown in FIG. 9, an auxiliary driving force output sprocket 103 that outputs an auxiliary driving force from a motor in addition to a driving sprocket (also called a front sprocket or a chain sprocket) 102 serving as a human driving force output wheel disposed near one end of a crankshaft 101, and a so-called single-shaft motor drive unit 200 shown in FIGS. 10 and 11 in which a human driving force generated by a pedal force and an auxiliary driving force generated by a motor are combined and the resultant force is outputted from a driving sprocket 201.

The double-shaft motor drive unit 100 is disclosed in, for example, Patent Literature 1. As shown in FIG. 9, the auxiliary driving force output sprocket 103 is provided in such a manner as to protrude to the outside of a unit case 104 of the motor drive unit 100 from a portion behind the driving sprocket 102 of the motor drive unit 100. The driving sprocket 102 that outputs a human driving force and the auxiliary driving force output sprocket 103 that outputs an auxiliary driving force are engaged with a chain 105 serving as an endless driving force transmission member. The human driving force and the auxiliary driving force are combined by the chain 105 and then are transmitted to the rear wheel.

Further behind the auxiliary driving force output sprocket 103, a tensioner device (also called a guide device) 106 is provided in engagement with the chain 105, which has been engaged with the auxiliary driving force output sprocket 103, so as to guide the chain 105 downward. Moreover, a tension sprocket 107 provided in the tensioner device 106 increases the winding angle of the chain 105 engaged with the auxiliary driving force output sprocket 103.

Meanwhile, the single-shaft motor drive unit 200 is disclosed in, for example, Patent Literature 2. As shown in FIGS. 10 and 11, the outer periphery of a crankshaft 202 that receives a human driving force transmitted from a pedal has a cylindrical human-power transmission member 203 that receives the human driving force transmitted by serration coupling and so on, and a combined force member 205 where a human driving force transmitted via the human-power transmission member 203 is combined with an auxiliary driving force from a motor 204. Subsequently, the human driving force from the human-power transmission member 203 is transmitted to the combined force member 205 via a one-way clutch 206. A large-diameter gear 205a that receives an auxiliary driving force from the motor 204 via a deceleration mechanism 207 is formed on one end of the combined force member 205, whereas the driving sprocket 201 is attached to the other end of the combined force member 205, the driving sprocket 201 serving as a driving force output wheel engaged with a chain 208 serving as an endless driving force transmission member. A resultant force on the combined force member 205 is transmitted from the driving sprocket 201 to the rear wheel through the chain 208.

As shown in FIGS. 10 and 11, the single-shaft motor drive unit 200 is configured such that the driving sprocket 201 is only engaged with the chain 208 and the resultant force of a human driving force and an auxiliary driving force is transmitted to the chain 208. In contrast, the double-shaft motor drive unit 100 needs to engage, as shown in FIG. 9, the driving sprocket 102 for transmitting a human driving force, the auxiliary driving force output sprocket 103 for transmitting an auxiliary driving force, and the tension sprocket 107 with the chain 105.

Thus, the area of the single-shaft motor drive unit 200 in side view (laterally projected area) can be advantageously smaller (compacter) than that of the double-shaft motor drive unit 100 by devising the layout of the motor 204 and the deceleration mechanism 207. A so-called front derailleur can be easily attached to the single-shaft motor drive unit 200 including the driving sprocket 201 with multiple stages. On the other hand, in the double-shaft motor drive unit 100, the driving sprocket 102, the auxiliary driving force output sprocket 103, and the tension sprocket 107 need to be engaged with the chain 105, leading to difficulty in attaching a front derailleur.

Moreover, the single-shaft motor drive unit 200 advantageously eliminates the need for providing the tensioner device 106 of the tension sprocket 107 or the like. Generally, braking devices used for electrically assisted bicycles include a rim brake, a band brake, and a roller brake that are operated with a brake lever attached to a handle bar as in those of ordinary bicycles. Depending on the regions or the request of an operator, the attachment of a coaster brake to the rear wheel may be required. The coaster brake is operated by rotating the pedal opposite to a forward rotation direction. In this case, however, the pedal rotated in the opposite direction applies a tension that pulls the lower part of the chain forward. Thus, the double-shaft motor drive unit 100 needs a unique design for the tensioner device 106, whereas the single-shaft motor drive unit 200 advantageously eliminates the need for such a unique design.

Typically, in the advantageous single-shaft motor drive unit 200, a magneto-striction torque sensor 209 for detecting a human driving force is provided on the outer periphery of the human-power transmission member 203, which receives a human driving force transmitted from the crankshaft 202, and a portion opposed to the outer periphery. Specifically, a magneto-striction generation portion is formed on the outer periphery of the human-power transmission member 203, and a coil 209a for detecting a change of magnetism on the magneto-striction generation portion is opposed to the magneto-striction generation portion. When the right and left pedals are pressed, the crankshaft 202 is twisted by a pedal force (human driving force). Thus, the twisted state of the human-power transmission member 203 that receives a human driving force transmitted from the crankshaft 202 is detected by the torque sensor 209.

The magneto-striction generation portion of the torque sensor 209 is formed on the outer periphery of the human-power transmission member 203 while the one-way clutch 206 is attached to the end of the human-power transmission member 203 as discussed above. The one-way clutch 206 is provided for the following reason: even if a rider stops pedaling on such a conventional electrically assisted bicycle, the motor 204 is controlled so as to keep rotating for a while (so-called delay control). In this case, the absence of the one-way clutch 206 may transmit an auxiliary driving force from the motor 204 to the crankshaft 202, causing the pedals to rotate without being pedaled by the rider. Thus, the one-way clutch 206 interrupts an auxiliary driving force from the motor 204 so as not to apply such a force to the crankshaft 202 or the pedals.

As shown in FIG. 11, a one-way clutch 210 is also provided between a rotating shaft 204a and a rotor 204b of the motor 204 in the single-shaft motor drive unit 200. If a battery for driving the motor 204 has run out during pedaling, the one-way clutch 210 eliminates the need for rotating the rotor 204b of the motor 204. Specifically, if the battery has run out during pedaling, the absence of the one-way clutch 210 rotates the rotor 204b of the motor 204 with a pedal force of the pedal. Thus, the cogging torque or the like of the motor 204 requires a large force for rotating the pedals (so-called drag resistance). To address this problem, the one-way clutch 210 is provided to eliminate the need for rotating the rotor 204b of the motor 204. This eliminates the need for applying an excessive force generated by, for example, the cogging torque of the motor 204.

Figure 12:
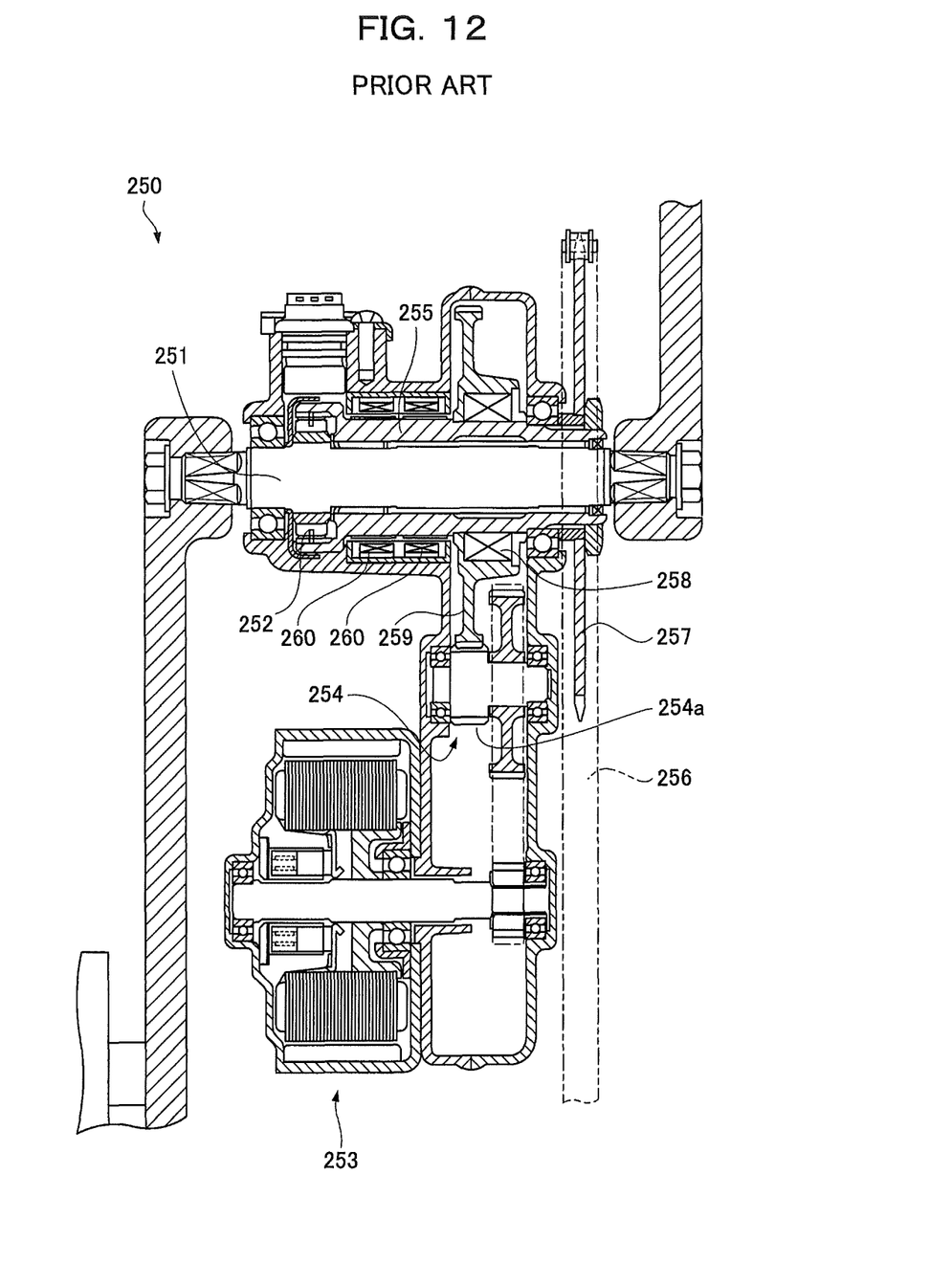
FIG. 12 is a plane section showing a single-shaft motor drive unit in another conventional electrically assisted bicycle.

Patent Literature 3 discloses an example of a single-shaft motor drive unit. As shown in FIG. 12, a single-shaft motor drive unit 250 includes a cylindrical combined force member 255 disposed on the outer periphery of a crankshaft 251 that receives a human driving force transmitted from the pedal. The combined force member 255 receives a human driving force transmitted from the crankshaft 251 through a one-way clutch 252 attached to one end of the combined force member 255 and receives an auxiliary driving force transmitted from a motor 253 through a deceleration mechanism 254 or the like. Moreover, a large-diameter gear 259 engaged with an output gear 254a of the deceleration mechanism 254 is attached to another one-way clutch 258 near the other end of the combined force member 255. An auxiliary driving force from the motor 253 is transmitted to the combined force member 255 through the deceleration mechanism 254, the large-diameter gear 259, and the one-way clutch 258, and then a resultant force combined on the combined force member 255 is transmitted from a driving sprocket 257 to the rear through a chain 256.

In the single-shaft motor drive unit 250, the magneto-striction generation portion is formed on the outer periphery of the combined force member 255 that receives a human driving force transmitted from the crankshaft 251 and an auxiliary driving force transmitted from the motor 253, and magneto-striction torque sensors 260 are provided. The torque sensor 260 has a coil that is opposed to the magneto-striction generation portion to detect a change of magnetism on the magneto-striction generation portion. When the right and left pedals are pressed, the crankshaft 251 is twisted and thus the twisted state of the combined force member 255 that receives a human driving force transmitted from the crankshaft 251 is detected by the torque sensor 260.

In the single-shaft motor drive unit 250 of FIG. 12, the one-way clutch 252 is attached to the one end of the combined force member 255. Thus, even if a rider stops pedaling, the motor 253 keeps rotating for a while. Also in this case, an auxiliary driving force from the motor 253 is interrupted by the one-way clutch 252 so as not to be applied to the crankshaft 251 or the pedals.

CITATION LIST

Patent Literatures

Patent Literature 1: Japanese Patent Laid-Open No. 2009-208710
Patent Literature 2: Japanese Patent Laid-Open No. 10-250673
Patent Literature 3: Japanese Patent Laid-Open No. 9-95289

SUMMARY OF INVENTION

Technical Problem

In the conventional single-shaft motor drive unit 200, however, the one-way clutch 206 shown in FIG. 11 is attached to the human-power transmission member 203 provided with the torque sensor 209 or the one-way clutches 252 and 258 shown in FIG. 12 are attached to the combined force member 255 provided with the torque sensors 260. Thus, vibrations during the switching operations of the one-way clutches 206, 252, and 258 and vibrations during engagement and passage of a cam are directly transmitted to the human-power transmission member 203 provided with the torque sensor 209 and the combined force member 255 provided with the torque sensors 260. This may cause noise during torque detection, leading to deterioration of torque detection capability.

In order to keep satisfactory assembly even after the one-way clutches 206, 252, and 258 are attached to the human-power transmission member 203 and the combined force member 255, the human-power transmission member 203 and the combined force member 255 are desirably made of materials having high wear resistance and are subjected to heat treatment. Since the magneto-striction generation portions of the torque sensors 209 and 260 need to be formed on the surfaces of the human-power transmission member 203 and the combined force member 255, the materials of the human-power transmission member 203 and the combined force member 255 are severely limited. In some cases, the torque sensors need to have low torque detection capability.

Since the one-way clutches 206, 252, and 258 are attached to the human-power transmission member 203 and the combined force member 255, a coaster brake cannot be provided on the hub of the rear wheel because the rotations of the pedals rotated opposite to the forward rotation direction cannot be transmitted to the driving sprockets 102, 201, and 257 and the chains 105, 208, and 256.

The present invention has been devised to solve the problems. An object of the present invention is to provide an electrically assisted bicycle including a so-called single-shaft motor drive unit that can satisfactorily keep torque detection capability and is compatible with a coaster brake.

Solution to Problem

In order to solve the problems, the present invention is an electrically assisted bicycle capable of traveling with a combination of a human driving force generated by a pedal force from a pedal and an auxiliary driving force generated by a motor, the electrically assisted bicycle being configured such that a cylindrical human-power transmission member is disposed on the outer periphery of a crankshaft that receives a human driving force from the pedal, the human-power transmission member receiving the transmitted human driving force and having a magneto-striction generation portion of a torque sensor for detecting the human driving force, a combined force member that combines a human driving force transmitted through the human-power transmission member and an auxiliary driving force from the motor is disposed on the outer periphery of the crankshaft, and the resultant force of a human driving force and an auxiliary driving force that are combined by the combined force member is transmitted to a rear wheel through a human driving force output wheel coaxial with the crankshaft and an endless driving force transmission member looped over the human driving force output wheel, the crankshaft, the human-power transmission member, and the combined force member forming a driving force transmission path not including a one-way clutch, the crankshaft being rotated so as to rotate the human-power transmission member and the combined force member accordingly regardless of the relative rotation directions of the crankshaft, the human-power transmission member, and the combined force member.

With this configuration, a one-way clutch is not provided on the driving force transmission path including the crankshaft, the human-power transmission member, and the combined force member. Thus, even if the human-power transmission member includes the magneto-striction generation portion of the torque sensor, vibrations caused by a one-way clutch are not transmitted to the human-power transmission member, thereby satisfactorily detecting a torque (human driving force). Since a one-way clutch does not need to be assembled to the human-power transmission member, the material of the human-power transmission member can be selected from a wide range of materials and thus a material with high torque detection capability is usable.

The present invention further includes a rotation detector that detects stop or a reversed rotation of the pedal. When the rotation detector detects stop or a reversed rotation of the pedal, the motor is stopped or braked by a control unit. In this case, the torque sensor is preferably used as the rotation detector.

With this configuration, when a rider stops pressing the pedals or reversely rotates the pedals during riding, this operation is detected by the rotation detector, and then the motor is immediately stopped or braked. This can prevent the application of an auxiliary driving force from the motor to the pedals. Moreover, the torque sensor used as the rotation detector can quickly and reliably detect stop or a reversed rotation of the pedals and eliminate the need for another rotation detector.

The present invention further includes a coaster brake on the hub of the rear wheel, the coaster brake being activated when the pedal is rotated opposite to the rotation direction of forward traveling. With this configuration, also in the case where the coaster brake is disposed on the hub of the rear wheel, a one-way clutch is not provided on the driving force transmission path including the crankshaft, the human-power transmission member, and the combined force member, and the rotations of the crankshaft are always transmitted to the combined force member. Thus, when the pedals are rotated opposite to forward traveling, the rotations of the pedals are satisfactorily transmitted to the coaster brake, satisfactorily activating the coaster brake.

The present invention further includes a deceleration mechanism on an auxiliary-driving-force transmission path from the motor to the combined force member, the deceleration mechanism having a plurality of reduction gears and a reduction gear support shaft that supports the reduction gears, and a one-way clutch disposed for interrupting a human driving force between one of the reduction gears and the reduction gear support shaft without transmitting a human driving force from the combined force member to the motor.

With this configuration, even if the pedals are pressed and rotated when a battery runs out, a one-way clutch for interrupting a human driving force between the reduction gear and the reduction gear support shaft eliminates the need for rotating the reduction gears and the motor. Thus, it is not necessary to apply an excessive force to the pedals.

The deceleration mechanism of the present invention includes a reduction gear having a deceleration large-diameter gear, a reduction-gear large-diameter support shaft, a deceleration small-diameter gear, and a reduction-gear small-diameter support shaft, a one-way clutch is disposed between the deceleration large-diameter gear and the reduction-gear large-diameter support shaft, and the deceleration small-diameter gear and the reduction-gear small-diameter support shaft are separate components, the deceleration small-diameter gear being integrated with the reduction-gear small-diameter support shaft.

With this configuration, the deceleration small-diameter gear and the reduction-gear small-diameter support shaft are separate components that are integrated during assembly by, for example, press-fitting the deceleration small-diameter gear onto the reduction-gear small-diameter support shaft. Thus, the gear of the combined force member can be engaged with the substantially overall width of the deceleration small-diameter gear, thereby minimizing the thickness of the reduction gear.

The present invention further includes a motor drive unit including the motor, the combined force member, the deceleration mechanism, and the control unit, and the motor and the control unit overlap each other in side view and are opposed to each other in a width direction in front view.

With this configuration, the area of the motor drive unit in side view (laterally projected area) can be reduced (made more compact), particularly as a single-shaft motor drive unit. The motor and the control unit are opposed to each other in the width direction of the motor drive unit and thus the control unit is hardly affected by heat from the motor so as to keep high reliability.

Advantageous Effects of Invention

According to the present invention, a one-way clutch is not provided on the driving force transmission path including the crankshaft, the human-power transmission member, and the combined force member. Thus, even if the human-power transmission member includes the magneto-striction generation portion of the torque sensor, vibrations caused by a one-way clutch are not transmitted to the human-power transmission member. This makes it possible to satisfactorily detect a torque (human driving force). Since a one-way clutch does not need to be assembled to the human-power transmission member, the material of the human-power transmission member can be selected from a wide range of materials and thus a material with high torque detection capability is usable. Thus, the electrically assisted bicycle can have higher reliability.

Furthermore, the rotation detector is provided to detect stop or a reversed rotation of the pedals. When the rotation detector detects stop or a reversed rotation of the pedals, the control unit stops or brakes the motor. When a rider stops pressing the pedals or reversely rotates the pedals during riding, the motor is stopped or braked. This can prevent the application of an auxiliary driving force from the motor to the pedals, eliminating the need for applying an excessive force to the pedals.

Moreover, the torque sensor used as the rotation detector can quickly and reliably detect stop or a reversed rotation of the pedals and eliminate the need for another rotation detector. Thus, the manufacturing cost can be lower than in the provision of another rotation detector.

The coaster brake can be satisfactorily activated on the hub of the rear wheel, the coaster brake being activated when the pedals are rotated opposite to the rotation direction of forward traveling.

The deceleration mechanism having the plurality of reduction gears and the reduction gear support shaft that supports the reduction gears is disposed on the auxiliary-driving-force transmission path including the motor and the combined force member. The one-way clutch for interrupting a human driving force is disposed between one of the reduction gears and the reduction gear support shaft and thus even if the pedals are pressed and rotated when the battery runs out, the reduction gears and the motor do not need to be rotated. Thus, it is not necessary to apply an excessive force to the pedals (so-called drag resistance can be considerably reduced).

The deceleration mechanism of the present invention includes the reduction gear having the deceleration large-diameter gear, the reduction-gear large-diameter support shaft, the deceleration small-diameter gear, and the reduction-gear small-diameter support shaft, the one-way clutch is disposed between the deceleration large-diameter gear and the reduction-gear large-diameter support shaft, and the deceleration small-diameter gear and the reduction-gear small-diameter support shaft are separate components, the deceleration small-diameter gear being integrated with the reduction-gear small-diameter support shaft. Thus, the gear of the combined force member can be engaged with the substantially overall width of the deceleration small-diameter gear. This can minimize the thickness of the reduction gear, allowing the motor drive unit to have a small lateral width.

Moreover, the motor drive unit includes the motor, the combined force member, the deceleration mechanism, and the control unit, and the motor and the control unit overlap each other in side view and are opposed to each other in the width direction in front view. With this configuration, the area of the motor drive unit in side view (laterally projected area) can be reduced (made more compact), particularly as the single-shaft motor drive unit. Moreover, the control unit is hardly affected by heat from the motor so as to keep high reliability.

DESCRIPTION OF EMBODIMENTS

An electrically assisted bicycle according to an embodiment of the present invention will be described below with reference to the accompanying drawings.

Figure 1:
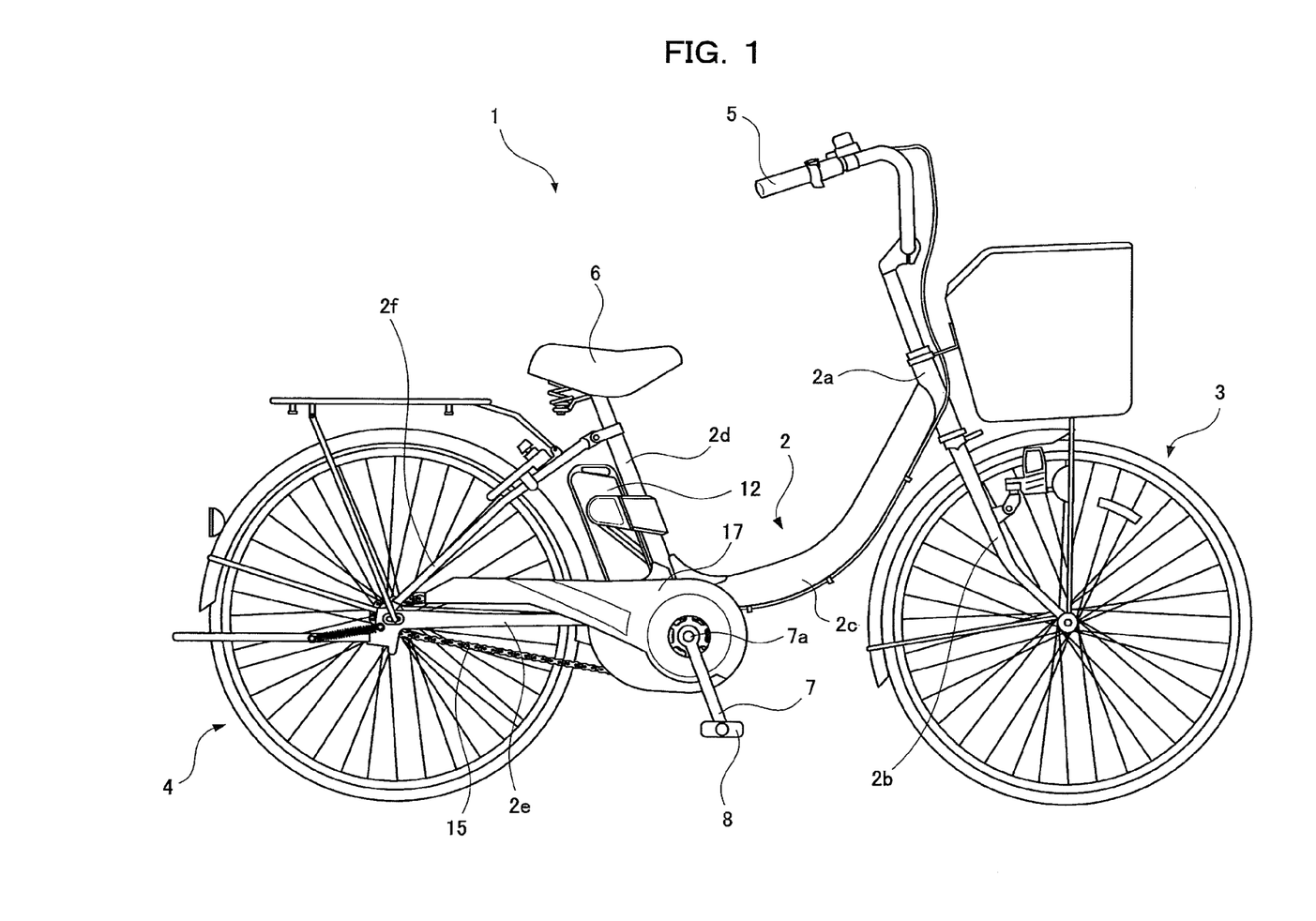
FIG. 1 is an overall side view of an electrically assisted bicycle according to an embodiment of the present invention.
Figure 2:
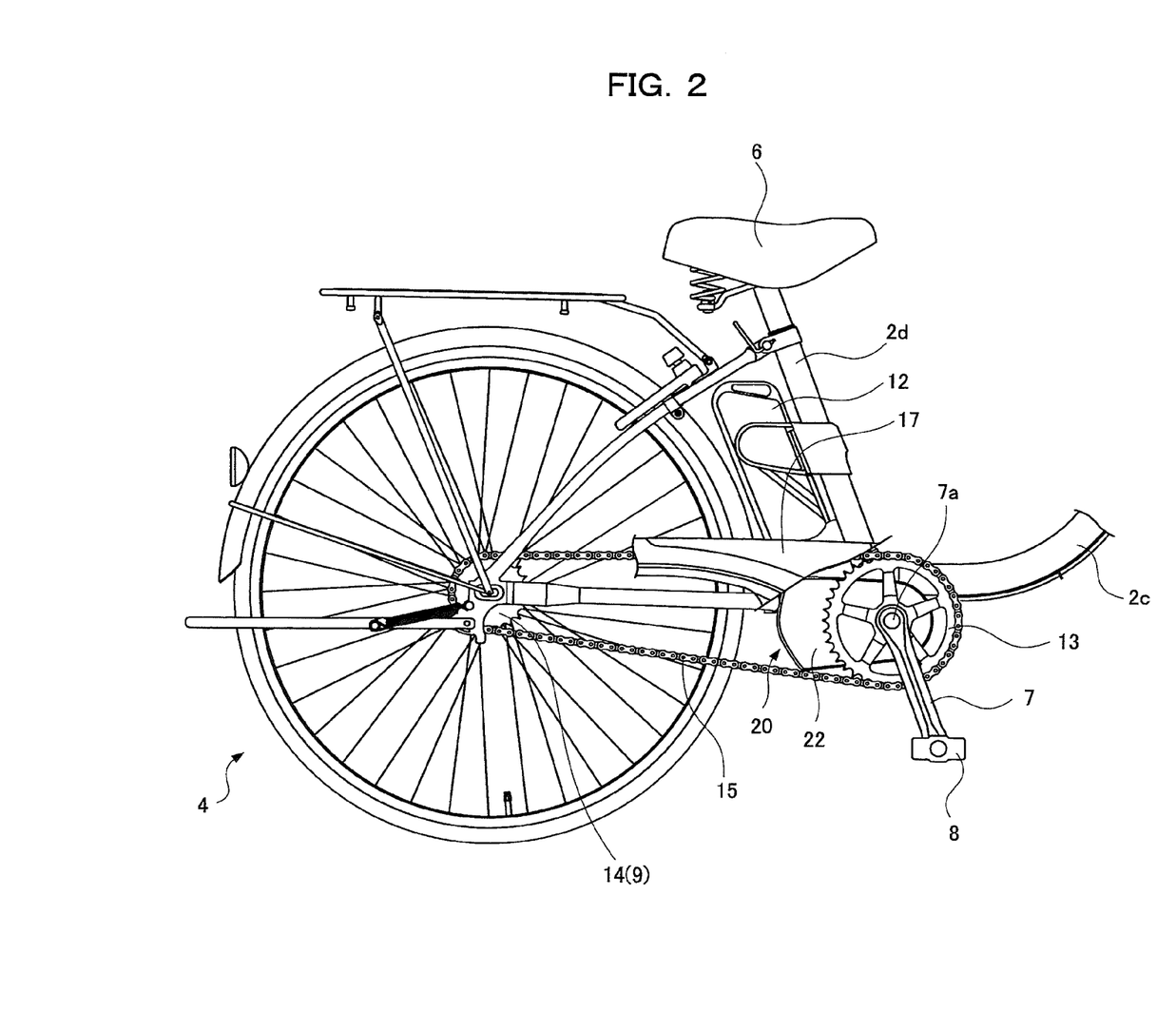
FIG. 2 is a partially cut side view of the electrically assisted bicycle.

In FIGS. 1 and 2, reference numeral 1 denotes an electrically assisted bicycle according to an embodiment of the present invention. As shown in FIGS. 1 and 2, the electrically assisted bicycle 1 comprises a metallic frame 2 including a head tube 2a, a front fork 2b, a main tube 2c, a seat tube 2d, a chain stay 2e, and a seat stay 2f, a front wheel 3 rotatably attached to the lower end of the front fork 2b, a rear wheel 4 rotatably attached to the rear end of the chain stay 2e, a handle bar 5 that changes the direction of the front wheel 3, a saddle 6, a crank 7 and pedals 8 that receive a human driving force including a pedal force, a motor drive unit 20 including an electric motor 21 (see FIG. 4) serving as a driving source for generating an auxiliary driving force (assist force) and a control unit 24 (see FIG. 4) for electrically controlling the motor 21 and so on, a battery 12 including a secondary battery for supplying driving power to the motor 21, a manual operation part (not shown) that is attached to the handle bar 5 or the like so as to be operated by a rider and so on, a driving sprocket (may be called a front sprocket, a crank sprocket, or a front gear) 13 that is attached so as to coaxially rotate with the crank 7 and serves as a driving force output wheel for outputting the resultant force of a human driving force and an auxiliary driving force, a rear sprocket (may be called a rear gear) 14 serving as a rear wheel attached to a hub (also called a rear hub) 9 of the rear wheel 4, a chain 15 serving as an endless driving force transmission member rotatably wound around the driving sprocket 13 and the rear sprocket 14 in an endless manner, and a chain cover 17 that laterally covers the chain 15 and so on. The battery 12 is an example of a power storage and is preferably a secondary battery. Another example of a power storage may be a capacitor.

As shown in FIGS. 1 and 2, also in the electrically assisted bicycle, the motor drive unit 20 is disposed at an intermediate position between the front wheel 3 and the rear wheel 4, for example, substantially behind a crankshaft 7a (specifically, under the intermediate position). This configuration locates the relatively heavy motor drive unit 20 at the center of the electrically assisted bicycle 1 in the longitudinal direction. Thus, the front wheel 3 and the rear wheel 4 are easily lifted and the electrically assisted bicycle can easily pass over a step of a path, achieving ease of handling of the body (e.g., the frame 2) of the electrically assisted bicycle 1 and high traveling stability.

Figure 3:
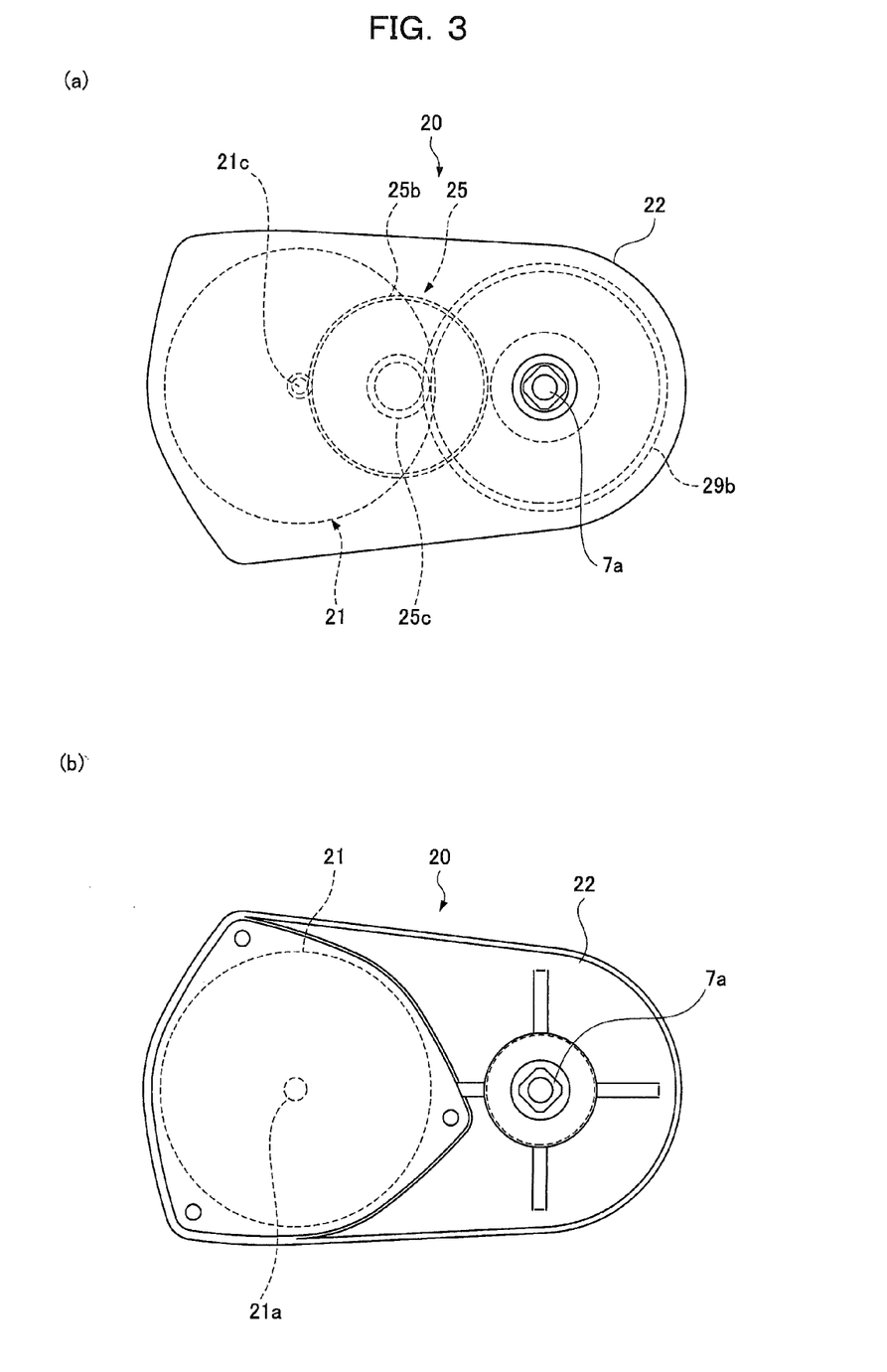
FIGS. 3(a) and 3(b) are left and right side views of the motor drive unit of the electrically assisted bicycle (a driving sprocket is omitted).
Figure 4:
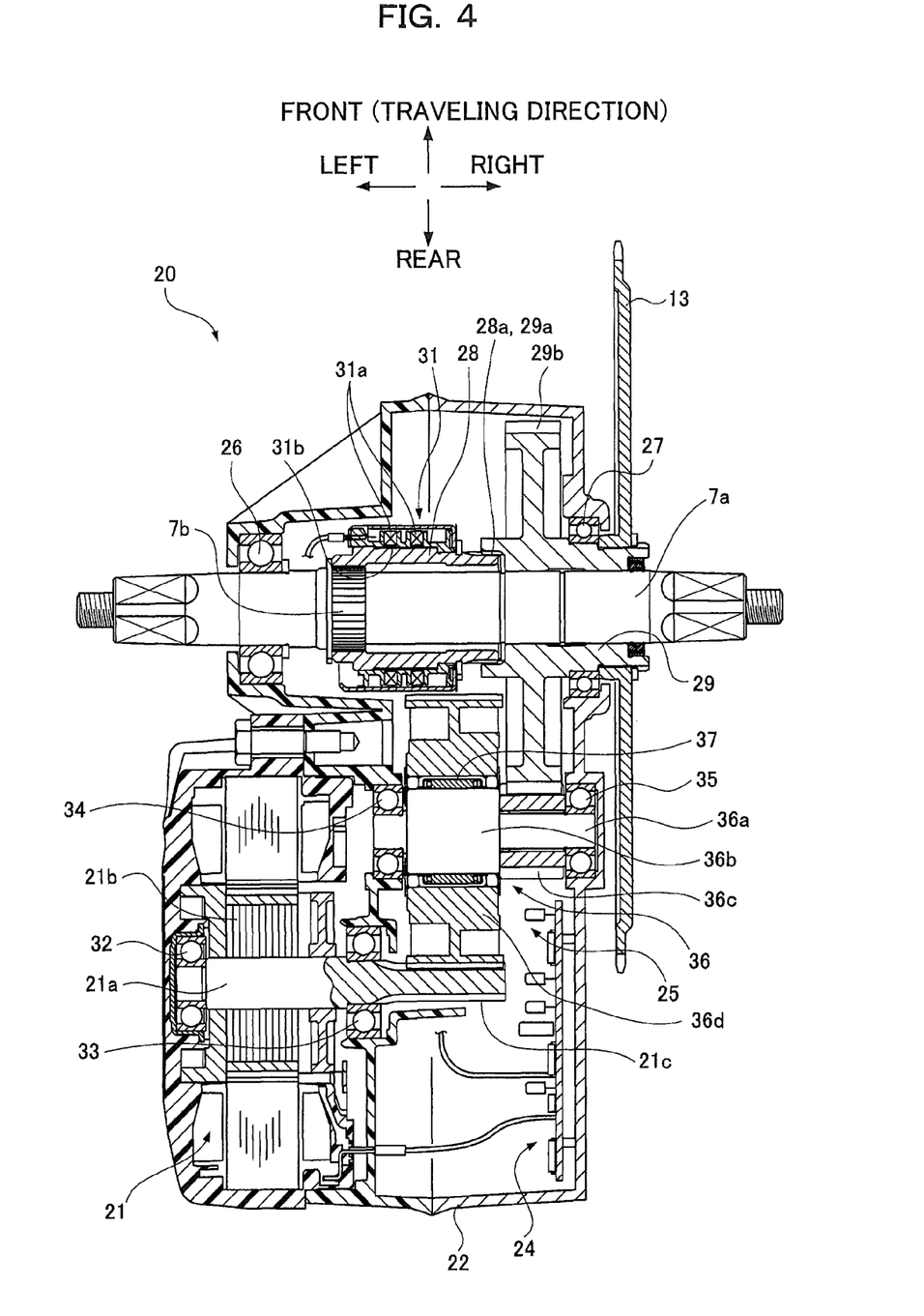
FIG. 4 is a plane section showing the motor drive unit of the electrically assisted bicycle.

FIGS. 3(a) and 3(b) are left and right side views of the motor drive unit 20 (the driving sprocket 13 is omitted). FIG. 4 is a plane section showing the motor drive unit 20. In the following explanation, a lateral direction and a longitudinal direction are, as shown in FIG. 4, set relative to the traveling direction of a rider on the electrically assisted bicycle 1. The configuration of the present invention is not limited to these directions.

As shown in FIGS. 3(a), 3(b), and 4, the motor drive unit 20 includes a unit case 22 constituting a casing and so on. The crankshaft 7a laterally penetrates the front of the motor drive unit 20. Moreover, the outer periphery of the crankshaft 7a has a human-power transmission member 28 that receives a human driving force transmitted from the crankshaft 7a and a combined force member 29 that combines the human driving force transmitted through the human-power transmission member 28 and an auxiliary driving force from the motor 21. Furthermore, a deceleration mechanism 25 including a reduction gear 36 is disposed at the center of the unit case 22 in the longitudinal direction, the motor 21 is disposed on the left side of the rear of the unit case 22, and the control unit 24 is disposed on the right side of the rear of the unit case 11. The control unit 24 includes a control printed circuit board that has electronic components for performing kinds of electrical control and a storage that contains kinds of information.

Specifically, as shown in FIG. 4, the crankshaft 7a laterally penetrating the front of the motor drive unit 20 is rotatably disposed with bearings 26 and 27. The cylindrical human-power transmission member 28 is fit onto the center of the outer periphery of the crankshaft 7a in the lateral direction via a serration part (spline part) 7b such that the human-power transmission member 28 rotates as an integral part. A magneto-striction generation portion 31b having magnetic anisotropy is formed on the outer surface of the human-power transmission member 28. Coils 31a are disposed with a certain clearance (space) on the outer periphery. The magneto-striction generation portion 31b and the coils 31a constitute a magneto-striction torque sensor (human power detection part) 31. With this configuration, a human driving force from the crankshaft 7a is transmitted to the human-power transmission member 28 and is detected by the torque sensor 31. In the magneto-striction torque sensor 31, the magneto-striction generation portion 31b is spirally formed with an angle of, for example, +45° to −45° with respect to the axial direction of the human-power transmission member 28. When a human driving force is transmitted to the human-power transmission member 28, the magneto-striction generation portion 31b on the surface of the human-power transmission member 28 is distorted so as to cause portions thereof to increase or decrease in magnetic permeability. Thus, a difference in the inductance of the coil 31a is measured so as to easily and quickly detect the direction of a torque (human driving force), that is, the reversed rotation of the crankshaft 7a in addition to the magnitude of the torque.

The combined force member 29 for combining a human driving force and an auxiliary driving force is disposed next to the right side of the human-power transmission member 28 on the outer periphery of the crankshaft 7a so as to rotate with respect to the crankshaft 7a. A serration part (or a spline part) 28a formed on the outer periphery of the right end of the human-power transmission member 28 and a serration part (or a spline part) 29a formed on the inner periphery of the left end of the combined force member 29 are fit into the combined force member 29. In this configuration, a one-way clutch is not provided between the crankshaft 7a and the human-power transmission member 28 and between the human-power transmission member 28 and the combined force member 29 (that is, a force transmission path including the crankshaft 7a, the human-power transmission member 28, and the combined force member 29). Thus, a human driving force transmitted to the crankshaft 7a is transmitted from the human-power transmission member 28 to the combined force member 29 so as to always rotate the crankshaft 7a, the human-power transmission member 28, and the combined force member 29 in an integrated manner.

Moreover, a large-diameter gear 29b for receiving an auxiliary driving force from the motor 21 is integrally formed on the outer periphery of the left side of the combined force member 29 while the driving sprocket 13 is fit onto the outer periphery of the right end of the combined force member 29 so as to rotate integrally with the combined force member 29. The bearing 27 fit onto the combined force member 29 rotatably supports the crankshaft 7a via the combined force member 29. A thin bearing or the like may be disposed between the combined force member 29 and the crankshaft 7a.

The motor 21 has a rotating shaft 21a and a rotor 21b that are rotatably supported by bearings 32 and 33. The rotating shaft 21a of the motor 21 protrudes to the right. A toothing part 21c is formed around the protruding part. The deceleration mechanism 25 is configured such that the running torque (auxiliary driving force) of the motor 21 is amplified and is transmitted to the large-diameter gear 29b of the combined force member 29 by means of the reduction gear 36. In this configuration, a reduction-gear small-diameter support shaft (an example of a reduction-gear support shaft, will be simply abbreviated as a small-diameter support shaft) 36a rotatably supported by bearings 34 and 35 and a reduction-gear large-diameter support shaft (another example of the reduction-gear support shaft, will be simply abbreviated as a large-diameter support shaft) 36b having a larger diameter than the small-diameter support shaft 36a are integrally formed on the support shaft (reduction-gear support shaft) of the reduction gear 36. A deceleration small-diameter gear (an example of a reduction gear, will be simply abbreviated as a small-diameter gear) 36c, which is a separate part of the small-diameter support shaft 36a, is assembled to the outer periphery of the small-diameter support shaft 36a so as to rotate integrally with the small-diameter support shaft 36a via a press-fitted or serration part (or a spline part). Moreover, the small-diameter gear 36c is engaged with the large-diameter gear 29b of the combined force member 29. Meanwhile, a reduction large-diameter gear (another example of the reduction gear, will be simply abbreviated as a large-diameter gear) 36d is disposed on the outer periphery of the large-diameter support shaft 36b of the reduction gear 36, and the large-diameter gear 36d is engaged with the toothing part 21c of the rotating shaft 21a of the motor 21. Between the large-diameter support shaft 36b and the large-diameter gear 36d of the reduction gear 36, a one-way clutch 37 for interrupting a human driving force is provided to prevent transmission of a turning force from the combined force member 29 to the motor 21.

If the inner periphery of the large-diameter gear 36d of the reduction gear 36 is rotated according to a motor output (auxiliary driving force), e.g., a certain auxiliary driving force is outputted during traveling, in a direction that moves forward the driving sprocket 13 relative to the outer periphery of the large-diameter support shaft 36b opposed to the large-diameter gear 36d (if the number of revolutions of the inner periphery of the large-diameter gear 36d of the reduction gear 36 in a forward direction is larger than that of the outer periphery of the large-diameter support shaft 36b, which is opposed to the large-diameter gear 36d, in the forward direction), the one-way clutch 37 operates so as to transmit an auxiliary driving force, which has been transmitted to the large-diameter gear 36d of the reduction gear 36, directly to the large-diameter support shaft 36b. Moreover, the auxiliary driving force is transmitted to the large-diameter gear 29b of the combined force member 29 via the small-diameter support shaft 36a and the small-diameter toothing part 36c. Thus, a human driving force and an auxiliary driving force are combined in the combined force member 29 and the resultant force is transmitted from the driving sprocket 13 to the rear wheel 4 through the chain 15.

On the other hand, if the inner periphery of the large-diameter gear 36d of the reduction gear 36 is rotated according to a motor output (auxiliary driving force) opposite to the direction that moves forward the driving sprocket 13 relative to the outer periphery of the large-diameter support shaft 36b opposed to the large-diameter gear 36d (if the number of revolutions of the inner periphery of the large-diameter gear 36d of the reduction gear 36 in the forward direction is smaller than that of the outer periphery of the large-diameter support shaft 36b, which is opposed to the large-diameter gear 36d, in the forward direction), for example, if the battery 12 runs out and the pedals 8 are pressed without an auxiliary driving force outputted from the motor 21, an auxiliary driving force transmitted to the large-diameter gear 36d of the reduction gear 36 is interrupted by the one-way clutch 37 so as not to be transmitted to the large-diameter support shaft 36b.

With this configuration, if the battery 12 runs out and the pedals 8 are pressed without an auxiliary driving force outputted from the motor 21, a human driving force rotates the small-diameter gear 36c, the small-diameter support shaft 36a, and the large-diameter support shaft 36b but does not rotate the large-diameter gear 36d and the rotating shaft 21a and the rotor 21b of the motor 21.

Figure 5:
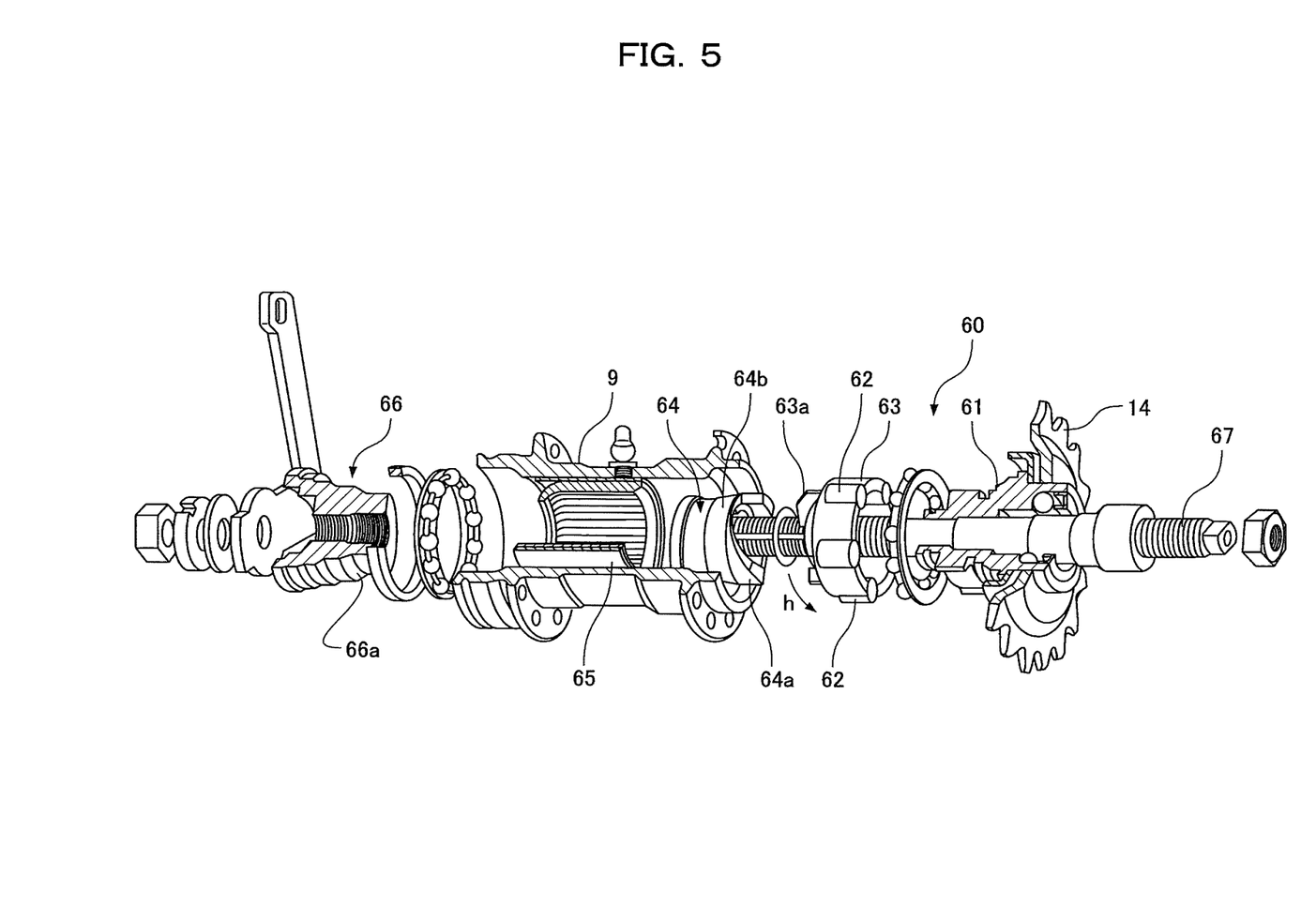
FIG. 5 is an exploded perspective view of the rear wheel of the electrically assisted bicycle.

In the electrically assisted bicycle 1, the braking device of the rear wheel 4 is not a rim brake for pressing a brake shoe, which is activated in response to an operation of a brake lever, to the rim of the front wheel, or a band brake or a roller brake for the rear 10. wheel. Instead of these braking devices, a coaster brake 60 shown in FIG. 5 is provided on the rear hub 9 (see FIG. 2, actually the rear hub 9 is provided behind the rear sprocket 14 shown in FIG. 2). The coaster brake 60 rotates the pedals 8 opposite to the rotation direction of forward traveling so as to brake the rear wheel 4. The braking device of the front wheel 3 may be a caliper brake or a rim brake that is activated by operating a brake lever, or the braking device may not be provided (In FIG. 1, the braking device of the front wheel 3 is not provided).

Figure 6:
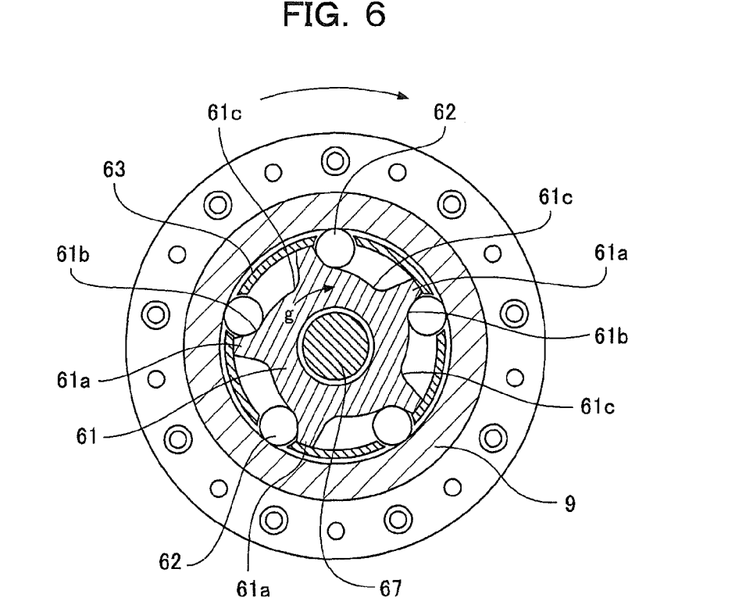
FIG. 6 is a longitudinal section showing the hub of the rear wheel of the electrically assisted bicycle, the rear wheel being rotated by a pedal force of pedals.
Figure 7:
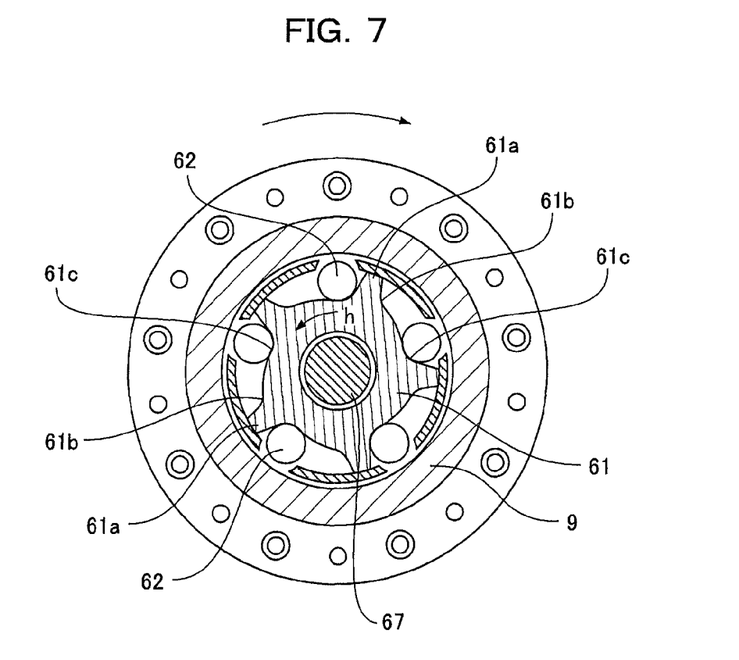
FIG. 7 is a longitudinal section showing the hub of the rear wheel of the electrically assisted bicycle with the pedals rotated opposite to forward traveling so as to activate a coaster brake or with the pedals stopped rotating during traveling.

FIG. 5 is an exploded perspective view of the hub (rear hub) 9 of the rear wheel 4 provided with the coaster brake 60. FIGS. 6 and 7 are cross-sectional views of the rear hub. In the present embodiment, the used coaster brake 60 is "roller clutch driven type" of bicycle coaster hub mechanism B type defined by JIS (Japanese Industrial Standards) D9419. The coaster brake 60 is disposed in a hub body that constitutes the casing of the rear hub 9 and rotates integrally with the rear wheel 4. As shown in FIGS. 5 to 7, the coaster brake 60 is rotatably fit onto a hub shaft 67 of the rear wheel 4, and the rear sprocket 14 is fixed to the outer periphery of one end (the right end in FIG. 5) of the coaster brake 60 so as rotate integrally with the coaster brake 60. The coaster brake 60 includes, on the other end thereof (the left end in FIG. 5), a driver 61 having protrusions 61a, large-diameter cam surfaces 61b, and small-diameter cam surfaces 61c that are circumferentially formed at proper intervals as shown in FIGS. 6 and 7, a cam base 63 that includes rollers 62 circumferentially disposed at proper intervals near the outer periphery of the cam base 63 and a cam portion 63a axially protruding to the left in FIG. 5, an expander 64 including an inclined cam portion 64a, which is engaged with the cam portion 63a of the cam base 63, and a tapered surface 64b, a brake shoe 65 that can be radially increased or reduced in diameter and can be brought into sliding contact with the inner surface of the rear hub 9, and a brake cone 66 having a tapered surface 66a capable of moving the brake shoe 65 to the outside.

If the pedals 8 are rotated in a normal traveling direction (the rotation direction of forward traveling, may be called a forward direction), the driver 61 is rotated via the chain 15 and the rear sprocket 14 in direction g shown in FIG. 6. Accordingly, the rollers 62 are pressed to the outside by the large-diameter cam surfaces 61b of the driver 61. The rollers 62 are thus firmly pressed between the driver 61 and the hub body of the rear hub 9 so as to integrate the hub body with the driver 61. This configuration rotates the overall rear wheel 4. At this point, the cam portion 63a of the cam base 63 is in contact with a thin portion of the inclined cam portion 64a of the expander 64 in the axial direction while the expander 64 is located on the right side in FIG. 7. Thus, the tapered surface 64b of the expander 64 does not come into contact with the brake shoe 65, separating the brake shoe 65 from the inner surface of the rear hub 9 without increasing the diameter of the brake shoe 65.

If the pedals 8 are rotated opposite to the rotation direction of forward traveling so as to reversely rotate the rear sprocket 14 via the chain 15, as shown in FIG. 7, the driver 61 is rotated in the same direction h as the rear sprocket 14. Thus, the locations of the rollers 62 are brought into contact with the small-diameter cam surfaces 61c of the driver 61 with a clearance from the inner surface of the hub body. However, when the rotation of the driver 61 in the direction h rotates the cam base 63 in the direction h via the rollers 62, the expander 64 in contact with the cam portion 63a of the cam base 63 with the inclined cam portion 64a is moved to the left in FIG. 5. Thus, the brake shoe 65 is pressed from two sides by the tapered surface 64b of the expander 64 and the tapered surface 66a of the brake cone 66 with an increasing diameter and is firmly pressed to the inner surface of the hub body of the rear hub 9. Accordingly, the rear wheel 4 is braked via the rear hub 9.

If the pedals 8 are stopped during traveling and the rotation of the rear sprocket 14 is stopped via the chain 15, a force for rotating the driver 61 in the direction g in FIG. 6 is eliminated. Thus, as shown in FIG. 7, the rollers 62 move to the small-diameter cam surfaces 61c of the driver 61 with a clearance from the inner surface of the rear hub 9. Since the driver 61 is not rotated, the cam base 63 is not rotated and thus the expander 54 stays on the right side in FIG. 7. This configuration does not bring the tapered surface 64*b* of the expander 64 into contact with the brake shoe 65, separating the brake shoe 65 from the inner surface of the rear hub 9 without increasing the diameter of the brake shoe 65. Consequently, even if the rear hub 9 is rotated, the rotary force of the rear hub 9 is not transmitted to the driver 61 and the rear sprocket 14. This leads to a freewheeling state as in the provision of a free wheel (a one-way clutch mechanism or a ratchet mechanism) between the rear hub 9 and the driver 61 or the rear sprocket 14, keeping a coasting state.

In the present embodiment, the coaster brake 60 is "roller clutch driven type". The coaster brake is not limited to this type and thus a "taper cone driven" coaster brake or a "multi-disc" coaster brake may be used instead.

With this configuration, when the pedal 8 is pressed during forward traveling, a human driving force according to a pedal force applied to the pedal 8 is transmitted from the crankshaft 7*a* to the combined force member 29 through the human-power transmission member 28, and then the human driving force is detected by the torque sensor 31 provided on the human-power transmission member 28. Moreover, an auxiliary driving force corresponding to the human driving force is transmitted to the combined force member 29 through, for example, the reduction gear 36 of the deceleration mechanism 25, and then a resultant force generated on the combined force member 29 is transmitted from the driving sprocket 13 to the rear wheel 4 through the chain 15. This facilitates riding on an uphill road and so on with the auxiliary driving force (assist force) applied from the motor according to the human driving force.

On the other hand, if a rider stops pressing the pedal 8 during riding, the rotation of the crankshaft 7*a* is also stopped. Thus, the stopped state is detected by the torque sensor 31 and then the motor 21 is immediately stopped or braked. This prevents the application of an auxiliary driving force from the motor 21 to the pedal 8, eliminating the need for applying an excessive force to the pedal 8.

If the rider reversely rotates the pedals 8 during riding, the driving sprocket 13 is also reversely rotated accordingly through the crankshaft 7*a*, the human-power transmission member 28, and the combined force member 29. This operation is transmitted through the chain 15 to the coaster brake 60 including the rear hub 9, activating the coaster brake 60.

In these operations, the conventional single-shaft motor drive unit includes the one-way clutch on the end of the human-power transmission member, which has the attached torque sensor, or the combined force member. Thus, vibrations during a switching operation of the one-way clutch or vibrations during engagement and passage of a cam are directly transmitted to the end of the human-power transmission member and the combined force member. This may cause noise during torque detection, leading to deterioration of torque detection capability. Such deterioration of torque detection capability may cause difficulty in precisely controlling a torque value or quickly controlling a torque value. Even if a coaster brake is provided on the hub of the rear wheel, the rotations of the pedals in forward and backward directions cannot be transmitted to the driving sprocket or the chain. Thus, the conventional single-shaft motor drive unit is not compatible with a coaster brake.

In contrast to this configuration, a one-way clutch is not provided on the driving force transmission path including the crankshaft 7*a*, the human-power transmission member 28, and the combined force member 29 in the embodiment of the present invention. Thus, even if the human-power transmission member 28 includes the magneto-striction generation portion 31*b* of the torque sensor 31, vibrations caused by a one-way clutch are not transmitted to the human-power transmission member 28. Accordingly, a torque (human driving force) can be satisfactorily detected, improving the reliability of the electrically assisted bicycle 1. Since a one-way clutch does not need to be assembled to the human-power transmission member 28, the material of the human-power transmission member 28 can be selected from a wide range of materials and thus a material with high torque detection capability is usable. This allows the use of the magneto-striction generation portion 31*b* of the torque sensor 31 with improved torque detection.

With this configuration, when a rider stops pressing the pedals 8 or reversely rotates the pedals 8 during riding, this operation is detected by the torque sensor 31 acting as a rotation detector, and then the motor 21 is immediately stopped or braked. This can prevent the application of an auxiliary driving force from the motor 21 to the pedals 8. Moreover, the torque sensor 31 used as the rotation detector can quickly and reliably detect stop or a reversed rotation of the pedals 8 and eliminate the need for another rotation detector. Thus, the manufacturing cost of the electrically assisted bicycle 1 can be reduced.

With this configuration, also in the case where the coaster brake 60 is disposed on the hub 9 of the rear wheel 4, a one-way clutch is not provided on the driving force transmission path including the crankshaft 7*a*, the human-power transmission member 28, and the combined force member 29 and the rotations of the pedals 8 and the crankshaft 7*a* are always transmitted to the combined force member 29. Thus, when the pedals 8 are rotated opposite to forward traveling, the rotations of the pedals 8 are satisfactorily transmitted to the coaster brake 60, satisfactorily activating the coaster brake 60.

With this configuration, the reduction gear 36 of the deceleration mechanism 25 is disposed on an auxiliary-driving-force transmission path from the motor 21 to the combined force member 29, the reduction gear 36 including the small-diameter and large-diameter gears 36*c* and 36*d* that serve as a plurality of reduction gears, and the small-diameter and large-diameter support shafts 36*a* and 36*b* that serve as reduction gear support shafts supporting the small-diameter and large-diameter gears 36*c* and 36*d*. In the present embodiment, between the large-diameter gear 36*d* and the large-diameter support shaft 36*b*, the one-way clutch 37 for interrupting a human driving force is provided to prevent transmission of a human driving force from the combined force member 29 to the motor 21.

With this configuration, if the battery 12 runs out and the pedals 8 are pressed without an auxiliary driving force outputted from the motor 21, a human driving force rotates the small-diameter gear 36*c*, the small-diameter support shaft 36*a*, and the large-diameter support shaft 36*b* but does not rotate the large-diameter gear 36*d* and the rotating shaft 21*a* and the rotor 21*b* of the motor 21. Thus, it is not necessary to apply an excessive force to the pedal 8 (a so-called drag resistance can be considerably reduced). In comparison with the conventional single-shaft motor drive unit shown in FIG. 11, a human driving force does not rotate the large-diameter gear 36*d* and the rotating shaft 21*a* of the motor 21, reducing a force for rotating the pedals 8 accordingly.

In the present embodiment, the small-diameter gear 36*c* and the small-diameter support shaft 36*a* are separate components that are integrated during assembly by, for example, press-fitting the small-diameter gear 36*c* onto the small-diameter support shaft 36a. Thus, the large-diameter gear 29b of the combined force member 29 can be engaged with the substantially overall width of the small-diameter gear 36c. This can minimize the thickness of the reduction gear 36, advantageously allowing the motor drive unit 20 to have a small lateral width.

In the present embodiment, as shown in FIG. 4, the motor 21 and the control unit 24 substantially overlap each other in side view. Thus, the area of the motor drive unit 20 in side view (laterally projected area) can be advantageously reduced (made more compact), particularly as the single-shaft motor drive unit 20. The motor 21 and the control unit 24 are opposed to each other in the width direction of the motor drive unit 20 (the motor 21 is disposed on the left side while the control unit 24 is disposed on the right side). Thus, the control unit 24 is hardly affected by heat from the motor 21 so as to keep high reliability.

In the present embodiment, the one-way clutch 37 for interrupting a human driving force is disposed between the large-diameter gear 36d and the large-diameter support shaft 36b. Instead of this, the one-way clutch 37 for interrupting a human driving force may be disposed between the small-diameter gear 36c and the small-diameter support shaft 36a.

Figure 8:
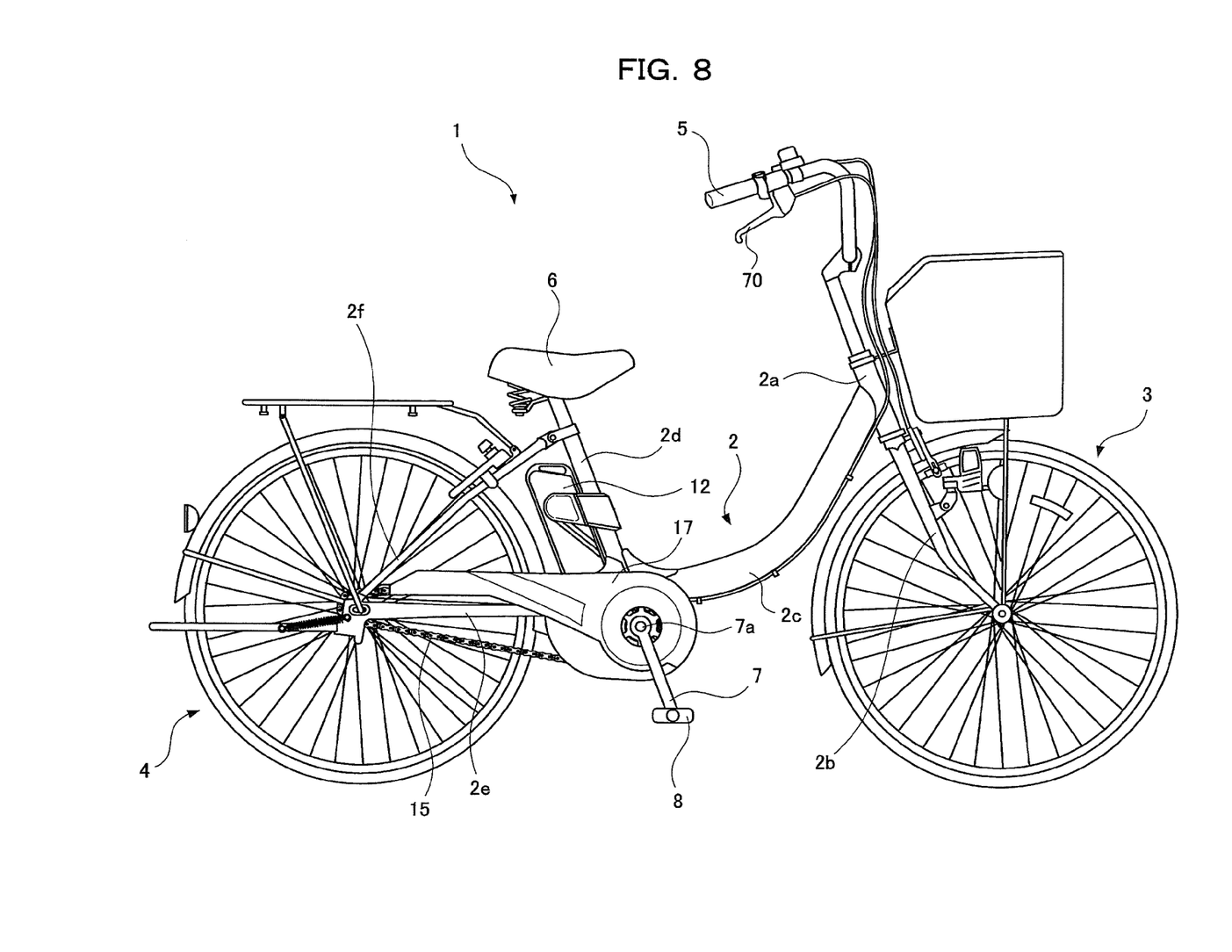
FIG. 8 is an overall side view of an electrically assisted bicycle according to another embodiment of the present invention.

In the present embodiment, the coaster brake 60 is provided on the rear hub 9. The present invention is not limited to this configuration. Specifically, the motor drive unit 20 of the present embodiment is also applicable to a rim brake, a band brake, or a roller brake that is provided as a braking device instead of the coaster brake 60 and is activated by operating a brake lever 70 (see FIG. 8) attached to the handle bar 5 as on an ordinary bicycle. In this case, a pedal-stopping one-way clutch that does not transmit a rotary force of the rear wheel 4 to the chain 15 may be disposed on the hub 9 of the rear wheel 4 so as to prevent the pedals 8 from rotating during forward traveling on a downhill or the like.

In the present embodiment, a front derailleur is not attached and the single driving sprocket 13 (single stage) is provided. The present invention is not limited to this configuration. A front derailleur may be attached with large and small driving sprockets.

INDUSTRIAL APPLICABILITY

The present invention is applicable to a variety of electrically assisted bicycles that can travel with a combination of a human driving force generated by a pedal force from a pedal and an auxiliary driving force generated by a motor.

The invention claimed is:

1. An electrically assisted bicycle capable of traveling with a combination of a human driving force generated by a pedal force from a pedal and an auxiliary driving force generated by a motor,
wherein the electrically assisted bicycle is configured such that a cylindrical human-power transmission member that is disposed on an outer periphery of a crankshaft that receives the human driving force from the pedal, the human-power transmission member receiving the human driving force and having a magneto-striction generation portion of a torque sensor for detecting the human driving force,
a combined force member that combines the human driving force transmitted through the human-power transmission member and the auxiliary driving force from the motor, and is disposed on the outer periphery of the crankshaft,
a resultant force of the human driving force and the auxiliary driving force that are combined by the combined force member is transmitted to a rear wheel through a human driving force output wheel coaxial with the crankshaft and an endless driving force transmission member looped over the human driving force output wheel,
the crankshaft, the human-power transmission member, and the combined force member form a driving force transmission path not including a one-way clutch, the crankshaft being rotated so as to rotate the human-power transmission member and the combined force member accordingly regardless of relative rotation directions of the crankshaft, the human-power transmission member, and the combined force member,
the electrically assisted bicycle further comprises a rotation detector that detects stop or a reversed rotation of the pedal, and
when the rotation detector detects stop or a reversed rotation of the pedal, the motor is stopped or braked by a control unit.

2. The electrically assisted bicycle according to claim 1, wherein the torque sensor is also used as the rotation detector.

3. The electrically assisted bicycle according to claim 1, further comprising a coaster brake on a hub of the rear wheel, the coaster brake being activated when the pedal is rotated opposite to a rotation direction of forward traveling.

4. The electrically assisted bicycle according to claim 1, further comprising a deceleration mechanism on an auxiliary-driving-force transmission path from the motor to the combined force member, the deceleration mechanism including a plurality of reduction gears and a reduction gear support shaft that supports the reduction gears,
wherein a one-way clutch is disposed for interrupting the human driving force between one of the plurality of reduction gears and the reduction gear support shaft without transmitting the human driving force from the combined force member to the motor.

5. The electrically assisted bicycle according to claim 4, wherein the plurality of reduction gears includes a deceleration large-diameter reduction gear and a deceleration small-diameter reduction gear,
the deceleration mechanism comprises the deceleration large-diameter gear, a reduction-gear large-diameter support shaft, the deceleration small-diameter gear, and a reduction-gear small-diameter support shaft,
the one-way clutch is disposed between the deceleration large-diameter gear and the reduction-gear large-diameter support shaft, and
the deceleration small-diameter gear and the reduction-gear small-diameter support shaft are separate components, the deceleration small-diameter gear being integrated with the reduction-gear small-diameter support shaft.

6. The electrically assisted bicycle according to claim 4, wherein a motor drive unit comprises the motor, the combined force member, the deceleration mechanism, and the control unit, and
the motor and the control unit overlap each other in side view and are opposed to each other in a width direction in front view.

* * * * *